(12) United States Patent
Sweeney et al.

(10) Patent No.: US 9,671,285 B2
(45) Date of Patent: Jun. 6, 2017

(54) SPECTROMETER

(71) Applicant: ASTRIUM LIMITED, Stevenage (GB)

(72) Inventors: Stephen Sweeney, Stevenage (GB); Yaping Zhang, Stevenage (GB)

(73) Assignee: ASTRIUM LIMITED, Stevenage, Hertfordshire (GB)

( * ) Notice: Subject to any disclaimer, the term of this patent is extended or adjusted under 35 U.S.C. 154(b) by 21 days.

(21) Appl. No.: 14/351,809

(22) PCT Filed: Oct. 9, 2012

(86) PCT No.: PCT/EP2012/069928
§ 371 (c)(1),
(2) Date: Apr. 14, 2014

(87) PCT Pub. No.: WO2013/053683
PCT Pub. Date: Apr. 18, 2013

(65) Prior Publication Data
US 2015/0300877 A1    Oct. 22, 2015

(30) Foreign Application Priority Data

Oct. 14, 2011 (EP) ..................... 11275127

(51) Int. Cl.
*G01J 3/02* (2006.01)
*G02B 6/122* (2006.01)
*G02B 6/293* (2006.01)

(52) U.S. Cl.
CPC .......... *G01J 3/0256* (2013.01); *G01J 3/0205* (2013.01); *G01J 3/0259* (2013.01); *G02B 6/1228* (2013.01); *G02B 6/29343* (2013.01)

(58) Field of Classification Search
None
See application file for complete search history.

(56) References Cited

U.S. PATENT DOCUMENTS 6,633,696 B1    10/2003   Vahala et al.
6,865,314 B1    3/2005    Blair et al.
(Continued)

FOREIGN PATENT DOCUMENTS

CA    2 653 710 A1    8/2010
GB    2 470 115 A     11/2010
(Continued)

OTHER PUBLICATIONS

International Search Report (PCT/ISA/210) mailed on Jan. 4, 2013, by the European Patent Office as the International Searching Authority for International Application No. PCT/EP2012/069928.
(Continued)

*Primary Examiner* — Kara E Geisel
*Assistant Examiner* — Shawn Decenzo
(74) *Attorney, Agent, or Firm* — Buchanan Ingersoll & Rooney PC

(57) ABSTRACT

A spectrometer comprises a substrate and a waveguide on the substrate, the waveguide including an elongate part and a tapered input for guiding electromagnetic radiation to the elongate part. The tapered input includes an input end for receiving the electromagnetic radiation and an output end coupled to the elongate part, the input end being wider than the output end. The spectrometer may further comprise a plurality of resonators coupled to the elongate part of the waveguide.

9 Claims, 3 Drawing Sheets

(56) References Cited

U.S. PATENT DOCUMENTS

| | | |
|---|---|---|
| 2001/0004411 A1 | 6/2001 | Yariv |
| 2002/0122615 A1 | 9/2002 | Painter et al. |
| 2005/0135721 A1 | 6/2005 | Painter et al. |
| 2005/0135764 A1 | 6/2005 | Painter et al. |
| 2005/0207699 A1 | 9/2005 | Painter et al. |
| 2006/0039653 A1 | 2/2006 | Painter et al. |
| 2006/0115215 A1* | 6/2006 | Liu .................. B82Y 20/00 385/43 |
| 2009/0220228 A1 | 9/2009 | Popovic |
| 2011/0273709 A1 | 11/2011 | Sweeney |

FOREIGN PATENT DOCUMENTS

| | | |
|---|---|---|
| JP | 5-203826 A | 8/1993 |
| JP | 7-63935 A | 3/1995 |
| JP | 2008-287169 A | 11/2008 |
| JP | 2010-211099 A | 9/2010 |
| WO | 03/001260 A1 | 1/2003 |
| WO | WO 2007/014218 A2 | 2/2007 |

OTHER PUBLICATIONS

Written Opinion (PCT/ISA/237) mailed on Jan. 4, 2013, by the European Patent Office as the International Searching Authority for International Application No. PCT/EP2012/069928.

International Search Report (PCT/ISA/210) mailed on Jan. 16, 2013, by the European Patent Office as the International Searching Authority for International Application No. PCT/EP2012/069956.

Written Opinion (PCT/ISA/237) mailed on Jan. 16, 2013, by the European Patent Office as the International Searching Authority for International Application No. PCT/EP2012/069956.

International Search Report (PCT/ISA/210) mailed on Mar. 13, 2013, by the European Patent Office as the International Searching Authority for International Application No. PCT/EP2012/069934.

Written Opinion (PCT/ISA/237) mailed on Mar. 13, 2013, by the European Patent Office as the International Searching Authority for International Application No. PCT/EP2012/069934.

International Search Report (PCT/ISA/210) mailed on Jan. 7, 2013, by the European Patent Office as the International Searching Authority for International Application No. PCT/EP2012/069957.

Written Opinion (PCT/ISA/237) mailed on Jan. 7, 2013, by the European Patent Office as the International Searching Authority for International Application No. PCT/EP2012/069957.

International Search Report (PCT/ISA/210) mailed on Mar. 13, 2013, by the European Patent Office as the International Searching Authority for International Application No. PCT/EP2012/069935.

Written Opinion (PCT/ISA/237) mailed on Mar. 13, 2013, by the European Patent Office as the International Searching Authority for International Application No. PCT/EP2012/069935.

Office Action issued Apr. 25, 2016 by the European Patent Office in corresponding European Patent Application No. 12 769 130.1 (5 pages).

Office Action issued Aug. 9, 2016 by the Japanese Patent Office in corresponding Japanese Patent Application No. 2014-535021, with an English translation thereof (3 pages).

Office Action issued Sep. 20, 2016 by the Chinese Patent Office in corresponding Chinese Patent Application No. 201280061657.8, with an English translation thereof (9 pages).

\* cited by examiner

SPECTROMETER

FIELD OF THE INVENTION

The present invention relates to a spectrometer. More particularly, but not exclusively, the present invention relates to a spectrometer comprising a waveguide including an elongate part and an input for guiding light to the elongate part.

BACKGROUND OF THE INVENTION

Spectrometers are used in many applications for measuring properties of light across a range of wavelengths. For example, a spectrometer can be used for compositional analysis, by obtaining absorption or emission spectra for an object of interest. The presence and location of peaks within the spectra can indicate the presence of particular elements or compounds. Spectrometers are commonly used for analysis at optical wavelengths, but can also be used at other wavelengths such as microwave and radio wavelengths.

Spectrometers are typically relatively complex and expensive devices that require the alignment of a number of moving parts to be controlled with high precision. For example, a typical spectrometer may focus light onto a diffraction grating to split an incident beam into separate wavelengths, and the diffraction grating may be rotated to a specific angle to direct light of a particular wavelength towards a detector. In recent years chip-based spectrometers have been developed which can be highly miniaturised, have no moving parts, and can be manufactured using well-established lithography techniques. An example of such a spectrometer-on-a-chip is shown in FIG. 1.

The chip spectrometer 100 comprises a substrate 110, onto which are patterned a waveguide 120 and a plurality of disk resonators coupled to the waveguide. The waveguide 120 guides the input light to the disk resonators. Light is input to one end of the waveguide, and each resonator 130 is arranged to support a resonant mode at a particular wavelength such that only light of that wavelength is coupled into the resonator 130. On top of each disk resonator 130 is an electrode 140 for detecting current that is proportional to the amount of light present in that resonator. The current detected in each resonator therefore indicates the amount of light at that wavelength that was present in the input beam of light. Each electrode 140 is further connected to a signal bond pad 150 for connecting the spectrometer 100 to an external device for measuring the current. The light input to the waveguide 120 has to be closely aligned to the centre of the waveguide 220, in order to achieve optimum coupling into the waveguide 220.

SUMMARY OF THE INVENTION

According to the present invention, there is provided a spectrometer comprising a substrate and a waveguide on the substrate, the waveguide comprising an elongate part and a tapered input for guiding electromagnetic radiation to the elongate part, wherein the tapered input has an input end for receiving the electromagnetic radiation and an output end coupled to the elongate part, the width of the input end being greater than the width of the output end.

The width of the input end may be greater than a free-space wavelength $\lambda_f$ of the electromagnetic radiation which the waveguide is arranged to receive.

The width of the input end may be between 1.5 $\lambda_f$ and 5 $\lambda_f$, where $\lambda_f$ is the free-space wavelength.

The tapered input may have a length designed to allow the optical mode to adiabatically compress into the waveguide.

The elongate part may have substantially the same width as the width of the output end of the tapered input.

The width of the elongate part may be substantially the same as the wavelength $\lambda_w$ of the radiation in a material from which the waveguide is formed.

The elongate part and the tapered input may be formed from the same material.

The elongate part and the tapered input may be integrally formed.

The radiation which the waveguide is arranged to guide may comprise a plurality of wavelengths and the spectrometer may further comprise a plurality of resonators coupled to the elongate part of the waveguide, each resonator being configured to support a resonant mode at one of the plurality of wavelengths.

BRIEF DESCRIPTION OF THE DRAWINGS

Embodiments of the present invention will now be described, by way of example only, with reference to FIGS. 2 to 6 of the accompanying drawings, in which.

DETAILED DESCRIPTION

Figure 2:
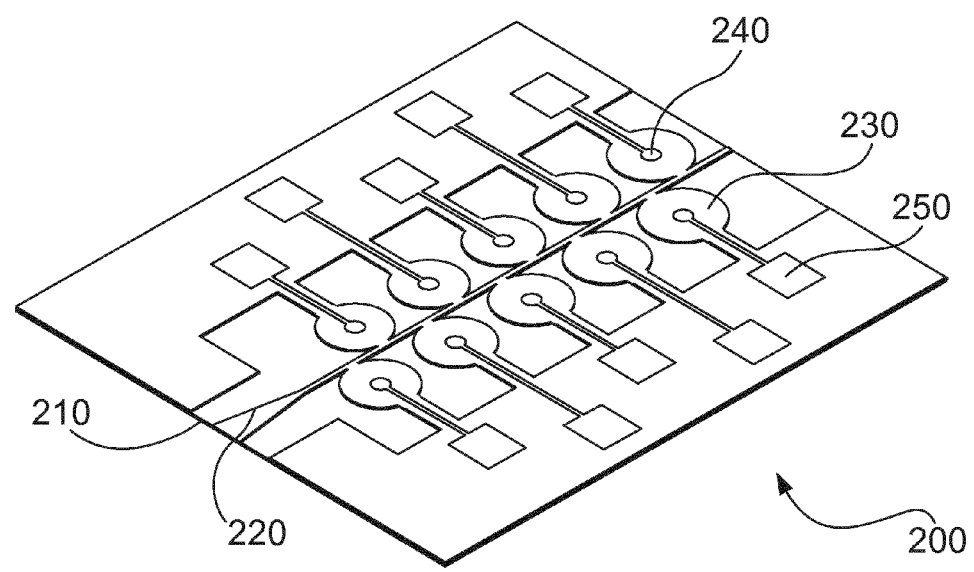
FIG. 2 illustrates a spectrometer having a tapered input to a waveguide, according to an embodiment of the present invention.

Referring now to FIG. 2, a spectrometer having a tapered input to a waveguide is illustrated, according to an embodiment of the present invention. As shown in FIG. 2 the spectrometer 200 is a spectrometer-on-a-chip, comprising a substrate 210, elongate waveguide 220 and a plurality of disk resonators 230 coupled to the waveguide. The waveguide may be a ridge waveguide. Each disk resonator 230 is provided with an electrode 240 for sensing a current in the disk resonator, the electrode 240 being connected to a bond pad 250 for connecting the spectrometer 200 to other components. The drawings are schematic, and provided for illustrative purposes only. In particular, other layers and components may be present even though for clarity they are omitted in FIG. 2. For instance, additional layers may be present in the waveguide 220 and/or the disk resonators 230.

Figure 1:
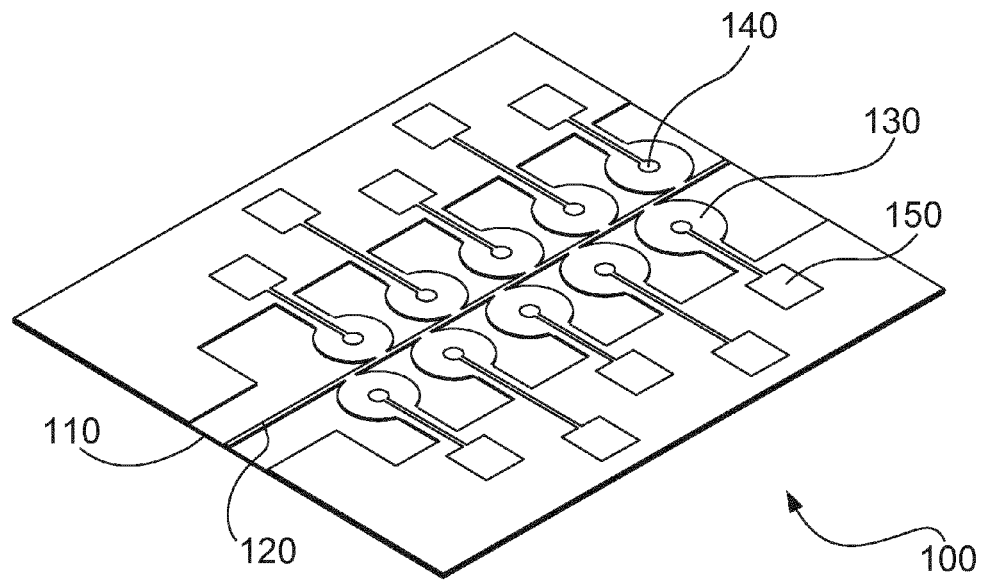
FIG. 1 illustrates a prior art spectrometer-on-a-chip.

Like the conventional chip-based spectrometer of FIG. 1, in the present embodiment the elongate waveguide 220 is coupled to the disk resonators 230 to guide input light to the disk resonators 230. Each disk resonator 230 is configured to support a resonant mode at a particular predetermined wavelength of light, such that only light of the predetermined wavelength is coupled from the waveguide 220 into the disk resonator 230. However, unlike a conventional spectrometer in which the elongate waveguide has a uniform width along its length, in the present embodiment the waveguide includes a tapered input coupled to the elongate part. The tapered input can ensure that even when the input light beam is not perfectly aligned with the centre line of the waveguide, a substantial proportion of the input energy can still be coupled into the elongate portion and directed to the disk resonators. Therefore, the use of a tapered input can allow manufacturing tolerances to be reduced, by relaxing the requirement for the chip-based spectrometer to be precisely aligned to the source of the input light beam.

Figure 3:
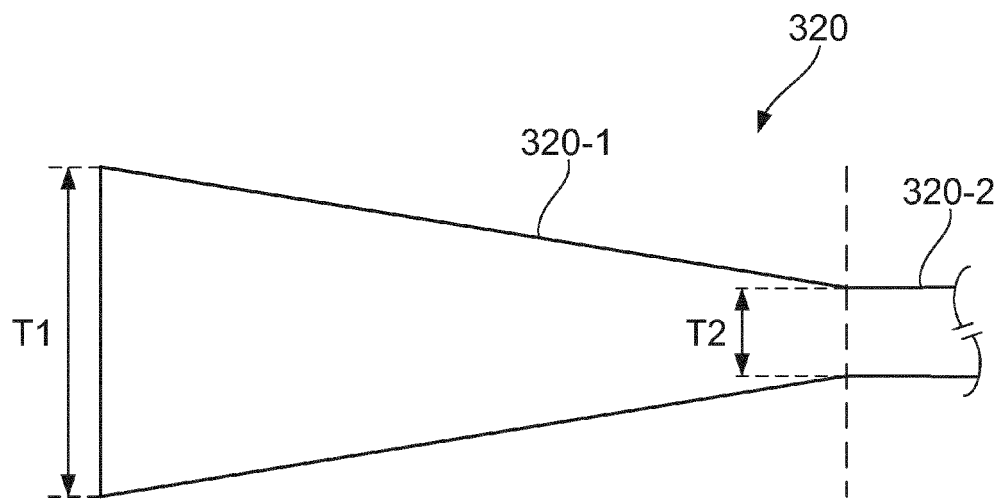
FIG. 3 illustrates a tapered input to a waveguide, according to an embodiment of the present invention.

A waveguide having a tapered input similar to the one shown in FIG. 2 is illustrated in more detail in FIG. 3. In FIGS. 2 and 3, the degree of taper is exaggerated for clarity, i.e. the horizontal and vertical scales in FIG. 3 are not the same. As shown in FIG. 3, the waveguide 320 includes a tapered input 320-1 and an elongate part 320-2. The width of the elongate part 320-2 may be substantially similar to the width of the elongate waveguide of the conventional spectrometer in FIG. 1. The width of the elongate part may be designed to support a single mode of resonance. For example, the width of the elongate part 320-2 may be similar to or slightly larger than one wavelength $\lambda_w$ of the input light beam in the waveguide 320. However, it is contemplated that other widths are possible.

Also, as shown in FIG. 3, the tapered input has an input end with a width of T1, and an output end with a width of T2. The output end is coupled to the elongate part 320-2, such that light input to the tapered input 320-1 is guided towards, and coupled into, the elongate part 320-2. The width of T1 is substantially greater than the width T2 of the output end. In some embodiments, the width of T1 is also greater than the free-space wavelength $\lambda_f$ of the radiation that is received by the waveguide. The input beam may include a plurality of wavelengths, for example when the device is a spectrometer as shown in FIG. 2. In such cases, the wavelengths $\lambda_f$ and $\lambda_w$ may, for example, be the mean wavelengths of the wavelength range of interest of the input beam in free-space and in the material of the waveguide respectively. The length of the tapered input 320-1 may be designed in conjunction with the width of the tapered input to ensure that the resonance mode compresses adiabatically.

In the present embodiment, the output end of the tapered input 320-1 is directly connected to the elongate part 320-2 to couple light into the elongate part 320-2. In particular, in the present embodiment the tapered input 320-1 and the elongate part 320-2 are integrally formed as a single component, and are formed of the same material, specifically InP and alloys thereof. However, in other embodiments other arrangements are possible, for example the tapered input 320-1 and elongate part 320-2 could be separated by a small air gap, and/or could be formed of different materials.

The waveguide 120 may also be integrally formed with the resonators 130. It may be formed on the substrate 110 in the same processing step as the resonators and from the same material, such as a suitable semiconductor material. The substrate may be manufactured from any suitable type of semiconductor. For example, the substrate may be formed from n-doped InP with a dopant concentration of about $1-3\times10^{18}$ cm$^{-3}$. On top of the substrate there may be provided an etch-stop layer, which prevents etching of the substrate, and on top of the etch-stop layer there may be provided a support layer. As an example, an etch-stop layer may be formed from n-doped InGaAsP with a dopant concentration of $0.18-1.2\times10^{18}$ cm$^{-3}$ and the support layer may be formed from n-doped InP with a dopant concentration of $4-6\times10^{17}$ cm$^{-3}$. The waveguide and the resonators are then provided as one or more layers on top of the support layer. The layers may be formed from undoped InGaAsP. On top of the one or more layers forming the waveguide there may be formed a capping layer. The capping layer may be formed from p-doped InP with a dopant concentration of about $2\times10^{18}$ cm$^{-3}$. There may also be provided an isolation layer for metallisation on top of the capping layer.

The one or more layers that provide the waveguide and the resonators may have a higher refractive index than the support layer and the capping layer and the waveguide is formed from the refractive index contrast between the layers forming the waveguide and the support layer and capping layers. It will be appreciated that the layer structure described above is just an example and one or more layers may be removed or replaced. For example the structure may not comprise a support layer, in which case the waveguide is provided between the refractive index contrast between the waveguide layers and the capping layer and the substrate.

The one or more layers that provide the waveguide and the resonators may comprise an absorbing layer with a band gap designed to absorb the radiation. It may be designed to have a low absorption coefficient to limit the absorption in the waveguide. The one or more layers may form an active layer stack comprising two cladding layers between which an active absorbing layer is sandwiched. The band gap of the absorbing layer may be less than the lowest-energy photon of interest, i.e. lower than the energy of a photon of the longest wavelength that the spectrometer is configured to detect. In this way, the composition of the absorbing layer can be used in all disk resonators in the spectrometer. The capping layer, the support layer and the cladding layers may have band gaps that are greater than the highest-energy photon of interest. The absorbing layer may be a quantum well. The quantum well may be grown by molecular beam epitaxy or chemical vapour deposition which can control the layer thickness down to monolayers. The quantum well is sufficiently thin to have little or no influence on the optical field in the waveguide. For example the quantum well may have a thickness of approximately 3 nm. When light of a particular wavelength enters the resonator from the waveguide, it travels multiple cycles around the resonator and the photons can be absorbed by the material in the quantum well as the band gap is sufficiently low for even the lowest-energy photons to excite electrons from the valence band into the conduction band, generating electron-hole pairs. The resulting current can be measured, and is proportional to the amount of light energy in the disk resonator. The waveguide ensures that the optical field is at a maximum over the quantum well which helps to increase absorption.

However, it will be appreciated that the structure does not have to be uniform across the resonators and the waveguide. The absorbing layer may not be provided in the waveguide. The absorbing layer in the waveguide 120 can be selectively etched and replaced by a wider band-gap alloy or the absorbing layer can to only be deposited in the disk resonators 130 in the first place.

It should of course be realised that the present invention is not limited to the layer structure described above, and in other embodiments other structures may be used.

Figure 4:
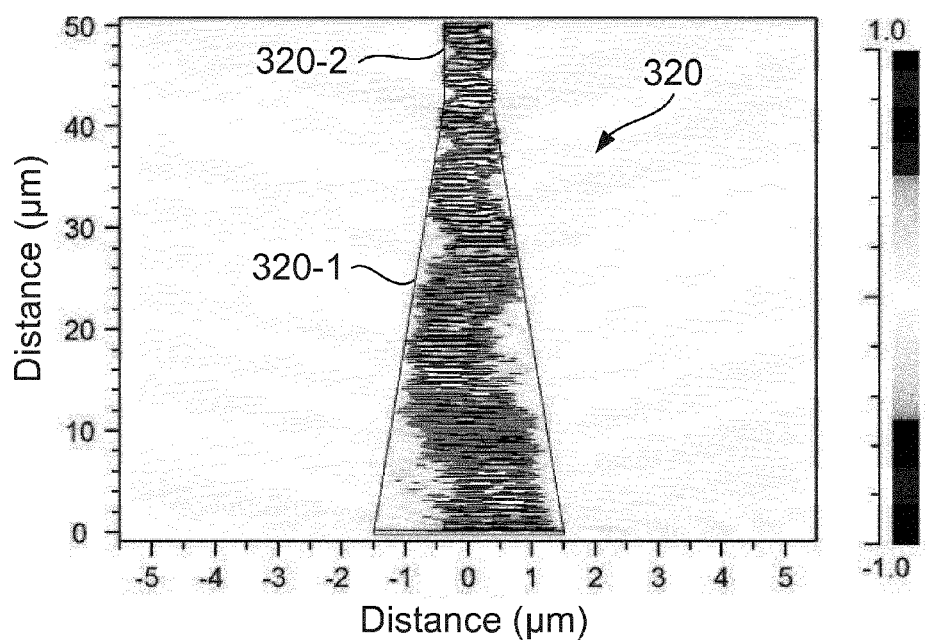
FIG. 4 illustrates a finite-difference time-domain (FDTD) simulation of a light beam input off-centre to the tapered input of FIG. 3.

Referring now to FIG. 4, a finite-difference time-domain (FDTD) simulation is illustrated of a light beam being input off-centre to the tapered waveguide shown in FIG. 3. Specifically, in FIG. 4 the input light beam has a free-space center wavelength of 1600 nm, and is input at an offset of 0.5 µm from the centre axis of the waveguide. If the waveguide is formed from a material with, for example, a refractive index of 3.1, the radiation in the waveguide material may have a wavelength of just over 500 nm. In the present embodiment the width T1 of the input end of the tapered input 320-1 is 3 µm, the width T2 of the output end coupled to the waveguide 320-2 is 0.75 µm, and the length of the tapered input 320-1 is about 42 µm. Accordingly, the width T1 of the input end is considerably larger than the free-space wavelength $\lambda_f$ of the radiation. However, it should be realised that the present invention is not limited to the above dimensions. As shown in FIG. 4, even when light is input off-centre to the waveguide, i.e. not aligned with the central axis of the waveguide, a substantial proportion of the input energy is still coupled into the tapered input 320-1 having a larger width at the input end, and is guided by the taper into the narrower elongate part 320-2. It was shown that about 80% of the power was collected and 40% of the power was propagated to a detector located 50 µm from the entrance to the waveguide in the elongate part.

In contrast to the embodiment shown in FIGS. 3 and 4, if a light beam is input at an offset of 0.5 µm to a 0.75 µm wide non-tapered waveguide such as the one shown in FIG. 1 but otherwise of a similar construction, only 10% of the input power is coupled into the waveguide and only 5% of the power is propagated to a detector located 50 µm from the entrance to the waveguide. The use of a tapered input, as shown in FIGS. 3 and 4, therefore allows substantially more input energy to be coupled into the waveguide, particularly when an input beam is improperly aligned with the centre axis of the waveguide.

Figure 5:
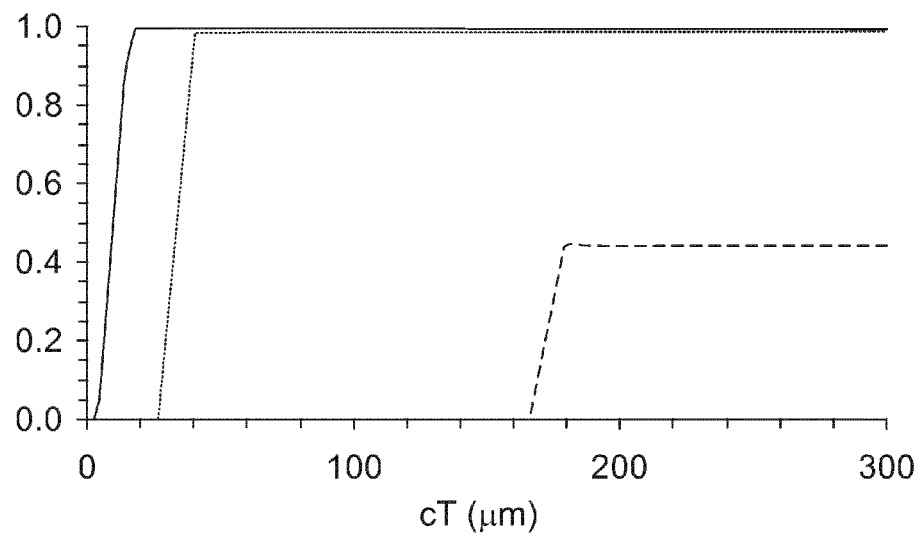
FIG. 5 is a graph showing coupling of light into a tapered waveguide having a 3 μm wide input.
Figure 6:
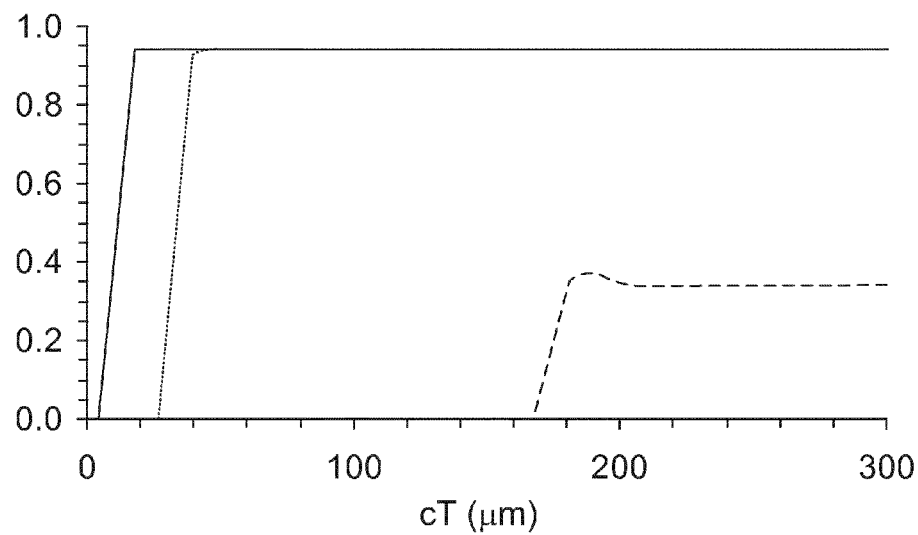
FIG. 6 is a graph showing coupling of light into a tapered waveguide having a 5 μm wide input.

Referring now to FIGS. 5 and 6, graphs are illustrated to show coupling of input light of wavelength 1.6 µm into the elongate part of a waveguide similar to that of FIGS. 2, 3 and 4, for different widths of the input end of the tapered input. The graphs show the results of simulations in which a monitor value corresponding to a proportion of input energy is plotted against distance into the waveguide. In both FIGS. 5 and 6, the input beam is aligned on-axis with the waveguide, i.e. is not offset from the waveguide axis. The graph in FIG. 5 shows results for an input end width of 3 µm, and the graph in FIG. 6 shows results for an input end width of 5 µm. In both cases, the output end of the tapered input and the elongate part is designed to support a single mode.

As shown in FIG. 5, for an input end width of 3 µm substantially all the input light energy is coupled into the waveguide at points close to the waveguide axis, shown by the solid and dotted lines in FIG. 5. The dashed line shows the amount of energy coupled into the waveguide at a certain distance from the waveguide axis, and shows that in this case about 45% of the input energy is still coupled into the waveguide.

Also, as shown in FIG. 6, for an input end width of 5 µm about 95% of input light energy is coupled into the waveguide at points close to the waveguide axis, shown by the solid and dotted lines. The dashed line shows that about 35% of input energy is coupled into the waveguide at a distance from the waveguide axis. That is, if the taper width is increased beyond a certain point, the amount of input energy coupled into the elongate part of the waveguide begins to be reduced. Therefore preferably the taper width may be chosen from within a certain range, for example between 1.5λ and 5λ, where λ is the free space wavelength. In some embodiments, the taper width may be chosen from within a range of 1.5λ, and 2.5λ. However, the exact values depend on the materials forming the waveguide. As mentioned before, a suitable material for the waveguide may be a semiconductor material Although embodiments of the present invention have been described in which a waveguide has an input that is tapered symmetrically in the horizontal plane, i.e. a plane parallel to the surface of the substrate, the present invention is not limited to this arrangement. For example, in some embodiments the tapered input of the waveguide may be asymmetric. Also, the tapered input may be tapered in the vertical direction, instead of or as well as being tapered in the horizontal direction. In some embodiments, the tapered input may be conical, or may be shaped as a conical section. Furthermore, although in the described embodiment a tapered input has an output end with the same width as the elongate part to which it is coupled, in other embodiments the width of the output end may be greater or less than the width of the elongate part, for example the waveguide may have a stepped profile where the output end is coupled to the elongate part.

Additionally, although embodiments have been described for receiving and guiding electromagnetic radiation at optical wavelengths, the present invention is not limited to optical wavelengths. For example, a tapered waveguide may be configured to guide electromagnetic radiation of any wavelength, for example electromagnetic radiation at a microwave wavelength instead of an optical wavelength.

Whilst certain embodiments of the present invention have been described above, the skilled person will understand that many variations and modifications are possible without departing from the scope of the invention as defined in the accompanying claims.

It will be appreciated that the spectrometer, with respect to which the invention has been described, may be considered to be, or form part of, a spectrophotometer. Therefore, where the term "spectrometer" has been used, the term could have been replaced with the term "spectrophotometer".

Additionally, although the spectrometer has been described to comprise disk resonators, the described waveguide may be used to guide light into any type of resonators. For example, the resonators may be any high Q cavities, such as spherical resonators, microrings etc.

The invention claimed is:

1. A spectrometer comprising:
   a substrate; and
   a waveguide on the substrate, the waveguide having an elongate part and a tapered input for guiding electromagnetic radiation to the elongate part,
   wherein the tapered input has an input end for receiving the electromagnetic radiation and an output end coupled to the elongate part, a width of the input end being greater than a width of the output end
   wherein the width of the input end is between $1.5\lambda_f$ and $2.5\lambda_f$, where $\lambda_f$ is a free space wavelength of the electromagnetic radiation which the waveguide is configured to receive.

2. The spectrometer of claim 1, wherein the elongate part has substantially a same width as the width of the output end of the tapered input.

3. The spectrometer of claim 1, wherein the elongate part and the tapered input are formed from a same material.

4. The spectrometer of claim 3, wherein the elongate part and the tapered input are integrally formed.

5. The spectrometer of claim 1, wherein the waveguide is configured to guide electromagnetic radiation of a plurality of wavelengths and the spectrometer comprises:
   a plurality of resonators coupled to the elongate part of the waveguide, each resonator being configured to support a resonant mode at one of the plurality of wavelengths.

6. The spectrometer of claim 3, wherein the elongate part has substantially a same width as the width of the output end of the tapered input.

7. The spectrometer of claim 6, wherein the elongate part and the tapered input are formed from a same material.

8. The spectrometer of claim 7, wherein the elongate part and the tapered input are integrally formed.

9. The spectrometer of claim 8, wherein the waveguide is configured to guide electromagnetic radiation of a plurality of wavelengths and the spectrometer comprises:
   a plurality of resonators coupled to the elongate part of the waveguide, each resonator being configured to support a resonant mode at one of the plurality of wavelengths.

* * * * *